United States Patent
Chen

(10) Patent No.: US 9,743,480 B2
(45) Date of Patent: *Aug. 22, 2017

(54) TWO-LEVEL LED SECURITY LIGHT WITH MOTION SENSOR

(71) Applicant: Chia-Teh Chen, Taipei (TW)

(72) Inventor: Chia-Teh Chen, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,752

(22) Filed: Aug. 8, 2016

(65) Prior Publication Data

US 2016/0345410 A1     Nov. 24, 2016

Related U.S. Application Data

(63) Continuation of application No. 14/478,150, filed on Sep. 5, 2014, now Pat. No. 9,445,474, which is a
(Continued)

(51) Int. Cl.
*H05B 37/02*        (2006.01)
*H05B 33/08*        (2006.01)
(Continued)

(52) U.S. Cl.
CPC ............ *H05B 33/0854* (2013.01); *F21S 9/03* (2013.01); *F21V 17/02* (2013.01); *G08B 5/36* (2013.01); *G08B 13/1895* (2013.01); *G08B 15/00* (2013.01); *G08B 15/002* (2013.01); *H05B 33/083* (2013.01); *H05B 33/0809* (2013.01); *H05B 33/0815* (2013.01); *H05B 33/0818* (2013.01); *H05B 33/0824* (2013.01); *H05B 33/0827* (2013.01); *H05B 33/0872* (2013.01); *H05B 37/02* (2013.01); *H05B 37/0218* (2013.01); *H05B 37/0227* (2013.01); *H05B 37/0281* (2013.01); *H05B 39/042* (2013.01); *H05B 39/044* (2013.01); *F21Y 2115/10* (2016.08); *G08B 13/189* (2013.01); *Y02B 20/40* (2013.01); *Y02B 20/44* (2013.01); *Y02B 20/46* (2013.01)

(58) Field of Classification Search
CPC ................................ H05B 37/02; H05B 33/08
USPC ................. 315/149, 152, 154, 307, 308, 312
See application file for complete search history.

(56) References Cited

U.S. PATENT DOCUMENTS

| | | | |
|---|---|---|---|
| 5,442,177 A | 8/1995 | Boulos et al. | |
| 5,598,066 A | 1/1997 | Wiesemann et al. | |

(Continued)

*Primary Examiner* — Tung X Le
(74) *Attorney, Agent, or Firm* — Rosenberg, Klein & Lee

(57) ABSTRACT

A two-level LED security light with a motion sensor. At night, the LED is turned on for a low level illumination. When the motion sensor detects any intrusion, the LED is switched from the low level illumination to a high level illumination for a short duration time. After the short duration time, the LED security light returns to the low level illumination for saving energy. The LED security light includes a power supply unit, a light sensing control unit, a motion sensing unit, a loading and power control unit, and a lighting-emitting unit. The lighting-emitting unit includes one or a plurality of LEDs which may be turned-on or turned-off according to the sensing results from the light sensing control unit. When the motion sensing unit detects an intrusion, the illumination of the LED security light can be immediately turned on to the high level to scare away the intruder.

48 Claims, 9 Drawing Sheets

Related U.S. Application Data continuation of application No. 13/222,090, filed on Aug. 31, 2011, now Pat. No. 8,866,392.

(51) Int. Cl.
| | |
|---|---|
| *G08B 15/00* | (2006.01) |
| *H05B 39/04* | (2006.01) |
| *F21S 9/03* | (2006.01) |
| *F21V 17/02* | (2006.01) |
| *G08B 5/36* | (2006.01) |
| *G08B 13/189* | (2006.01) |
| *F21Y 115/10* | (2016.01) |

(56) References Cited

U.S. PATENT DOCUMENTS

| | | |
|---|---|---|
| 5,747,937 A | 5/1998 | Wiesemann et al. |
| 6,225,748 B1 | 5/2001 | Evans et al. |
| 6,586,890 B2 | 7/2003 | Min et al. |
| 6,820,998 B2 | 11/2004 | Chen |
| 6,888,323 B1 | 5/2005 | Null et al. |
| 6,909,239 B2 | 6/2005 | Gauna |
| 6,927,541 B2 | 8/2005 | Lee |
| 7,190,125 B2 | 3/2007 | McDonough et al. |
| 7,268,497 B2 | 9/2007 | Hsieh |
| 7,296,913 B2 | 11/2007 | Catalano et al. |
| 7,344,275 B2 | 3/2008 | Allen et al. |
| 7,405,524 B2 | 7/2008 | Null et al. |
| 7,450,095 B2 | 11/2008 | Yu et al. |
| 7,564,198 B2 | 7/2009 | Yamamoto et al. |
| 7,804,252 B2 | 9/2010 | Chen |
| 7,967,468 B2 * | 6/2011 | Levine .................. F21S 8/03 362/191 |
| 8,310,163 B2 | 11/2012 | Chen |
| 8,598,805 B2 | 12/2013 | Tremblay et al. |
| 9,271,345 B2 | 2/2016 | Welten |
| 2006/0022916 A1 | 2/2006 | Aiello |
| 2007/0182338 A1 | 8/2007 | Shteynberg et al. |
| 2007/0182346 A1 * | 8/2007 | Shteynberg ........ H05B 33/0815 315/308 |
| 2007/0182347 A1 | 8/2007 | Shteynberg et al. |
| 2008/0258647 A1 | 10/2008 | Scianna |
| 2009/0160369 A1 | 6/2009 | Godbole et al. |
| 2012/0262069 A1 * | 10/2012 | Reed .................. H05B 37/0281 315/130 |

* cited by examiner

TWO-LEVEL LED SECURITY LIGHT WITH MOTION SENSOR

CROSS-REFERENCE TO RELATED APPLICATIONS

This is a continuation application of prior application Ser. No. 14/478,150 filed on Sep. 5, 2014, currently pending, which is a Continuation of Ser. No. 13/222,090, filed 31 Aug. 2011, issued as U.S. Pat. No. 8,866,392 on 21 Oct. 2014.

BACKGROUND

1. Technical Field

The present disclosure relates to a lighting apparatus, in particular, to a two-level security LED light with motion sensor

2. Description of Related Art

Lighting sources such as the fluorescent lamps, the incandescent lamps, the halogen lamps, and the light-emitting diodes (LED) are commonly found in lighting apparatuses for illumination purpose. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY

An exemplary embodiment of the present disclosure provides a two-level LED security light with motion sensor which may switch to high level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in the low level illumination to save energy.

An exemplary embodiment of the present disclosure provides a two-level LED security light including a power supply unit, a light sensing control unit, a motion sensing unit, a loading and power control unit, and a light-emitting unit. The light-emitting unit further includes one or a plurality of series-connected LEDs; when the light sensing control unit detects that the ambient light is lower than a predetermined value, the loading and power control unit turns on the light-emitting unit to generate a high level or a low level illumination; when the light sensing control unit detects that the ambient light is higher than the predetermined value, the loading and power control unit turns off the light-emitting unit; when the motion sensing unit detects a human motion in the PS mode, the loading and power control unit increases the electric current that flows through the light-emitting unit so as to generate the high level illumination for a predetermined duration.

Another exemplary embodiment of the present disclosure provides a two-level LED security light including a power supply unit, a light sensing control unit, a motion sensing unit, a loading and power control unit, a light-emitting unit. The light-emitting unit includes a plurality of series-connected LEDs. When the light sensing control unit detects that the ambient light is lower than a predetermined value, the loading and power control unit turns on a portion or all the LEDs of the light-emitting unit to generate a low level or a high level illumination; when the light sensing control unit detects that the ambient light is higher than the predetermined value, the loading and power control unit turns off all the LEDs in the light-emitting unit; when the motion sensing unit detects a human motion in the PS mode, the loading and power control unit turns on a plurality of LEDs in the light-emitting unit and generates the high level illumination for a predetermine duration. An electric current control circuit is integrated in the exemplary embodiment for providing constant electric current to drive the LEDS in the light-emitting unit.

One exemplary embodiment of the present disclosure provides a two-level LED security light including a power supply unit, a light sensing control unit, a motion sensing unit, a loading and power control unit, and a light-emitting unit. The light-emitting unit includes a phase controller and one or a plurality of parallel-connected alternating current (AC) LEDs. The phase controller is coupled between the described one or a plurality parallel-connected ACLEDs and AC power source. The loading and power control unit may through the phase controller control the average power of the light-emitting unit; when the light sensing control unit detects that the ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermine duration.

According to an exemplary embodiment of the present disclosure, a two-level LED security light includes a power supply unit, a light sensing control unit, a motion sensing unit, a loading and power control unit, and a light-emitting unit. The light-emitting unit includes X high wattage ACLEDs and Y low wattage ACLEDs connected in parallel. When the light sensing control unit detects that the ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that the ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto turn off at dawn. The PC mode may generate a high level illumination for a predetermined duration then automatically switch to the PS mode by a control unit to generate a low level illumination. When the motion sensor detects a human motion, the disclosed LED security light may immediate switch to the high level illumination for a short predetermined duration thereby achieve illumination or warning effect. After the short predetermined duration, the LED security light may automatically return to the low level illumination for saving energy.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
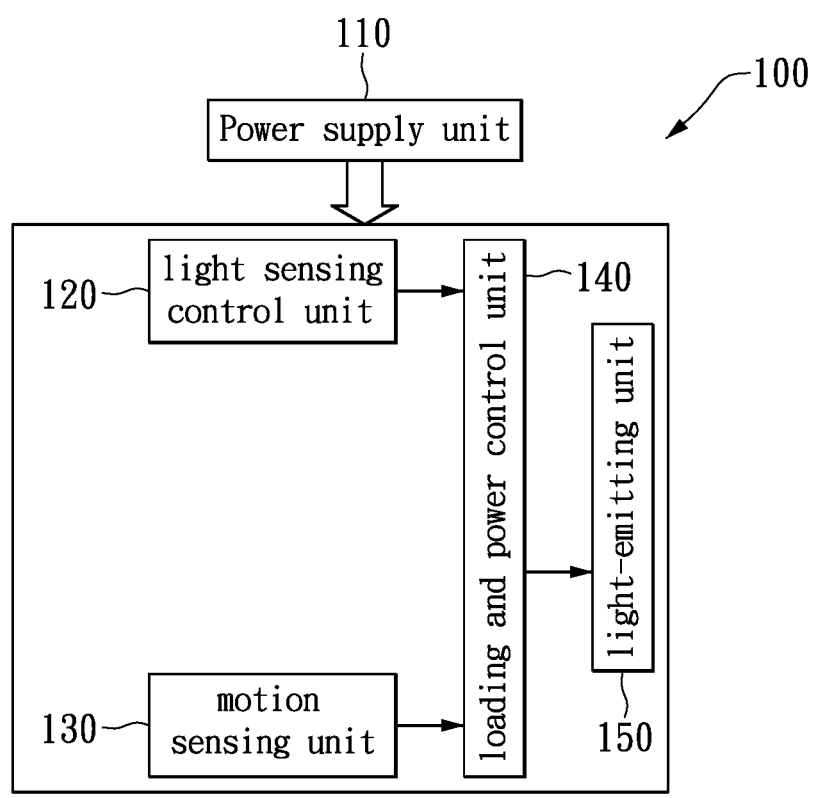
FIG. 1 schematically illustrates a block diagram of a two-level LED security light in accordance with an exemplary embodiment of the present disclosure.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Refer to FIG. 1, which schematically illustrates a block diagram of a two-level LED security light in accordance to the first exemplary embodiment of the present disclosure. A two-level LED security light (herein as the lighting apparatus) 100 includes a power supply unit 110, a light sensing control unit 120, a motion sensing unit 130, a loading and power control unit 140, and a light-emitting unit 150. The power supply unit 110 is used for supplying power required to operate the system, wherein the associated structure includes the known AC/DC voltage converter. The light sensing control unit 120 may be a photoresistor, which may be coupled to the loading and power control unit 140 for determining daytime or nighttime in accordance to the ambient light. The motion sensing unit 130 may be a passive infrared sensor (PIR), which is coupled to the loading and power control unit 140 and is used to detect intrusions. When a person is entering a predetermined detection zone of the motion sensing unit 130, a sensing signal thereof may be transmitted to the loading and power control unit 140.

The loading and power control unit 140 which is coupled to the light-emitting unit 150 may be implemented by a microcontroller. The loading and power control unit 140 may control the illumination levels of the light-emitting unit 150 in accordance to the sensing signal outputted by the light sensing control unit 120 and the motion sensing unit 130. The light-emitting unit 150 may include a plurality of LEDs and switching components. The loading and power control unit 140 may control the light-emitting unit 150 to generate at least two levels of illumination variations.

When the light sensing control unit 120 detects that the ambient light is lower than a predetermined value (i.e., nighttime), the loading and power control unit 140 executes the Photo-Control (PC) mode by turning on the light-emitting unit 150 to generate a high level illumination for a predetermined duration then return to a low level illumination for Power-Saving (PS) mode. When the light sensing control unit 120 detects that the ambient light is higher than a predetermined value (i.e., dawn), the loading and power control unit 140 turns off the light-emitting unit 150. In the PS mode, when the motion sensing unit 130 detects a human motion, the loading and power control unit 140 may increase the electric current which flow through the light-emitting unit 150, to generate the high level illumination for a short predetermined duration. After the short predetermined duration, the loading and power control unit 140 may automatically lower the electric current that flow through the light-emitting unit 150 thus have the light-emitting unit 150 return to low level illumination for saving energy.

Refer to 2A, which illustrates a schematic diagram of a two-level LED security light in accordance to the first exemplary embodiment of the present disclosure. The light sensing control unit 120 may be implemented by a light sensor 220; the motion sensing unit 130 may be implemented by a motion sensor 230; the loading and power control unit 140 may be implemented by a microcontroller 240. The light-emitting unit 250 includes three series-connected LEDs L1~L3. The LEDs L1~L3 is connected between a DC source and a transistor Q1, wherein the DC source may be provided by the power supply unit 110. The transistor Q1 may be an N-channel metal-oxide-semiconductor field-effect-transistor (NMOS). The transistor Q1 is connected between the three series-connected LEDs L1~L3 and a ground GND. The loading and power control unit 140 implemented by the microcontroller 240 may output a control signal like a pulse width modulation (PWM) signal to the gate of transistor Q1 to control the average electric current. It is worth to note that the electric components depicted in FIG. 2A only serves as an illustration for the exemplary embodiment of the present disclose and hence the present disclosure is not limited thereto.

Figure 2A:
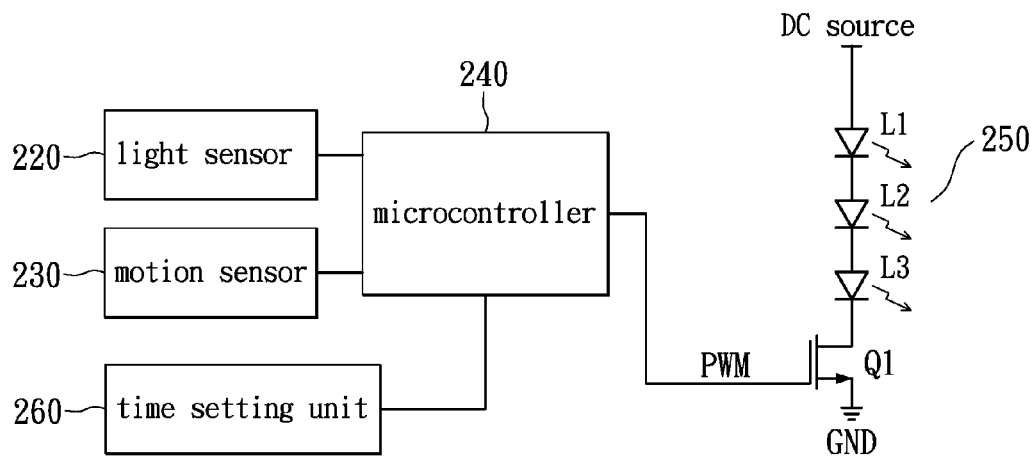
FIG. 2A illustrates a schematic diagram of a two-level LED security light in accordance to the first exemplary embodiment of the present disclosure.
Figure 2B:
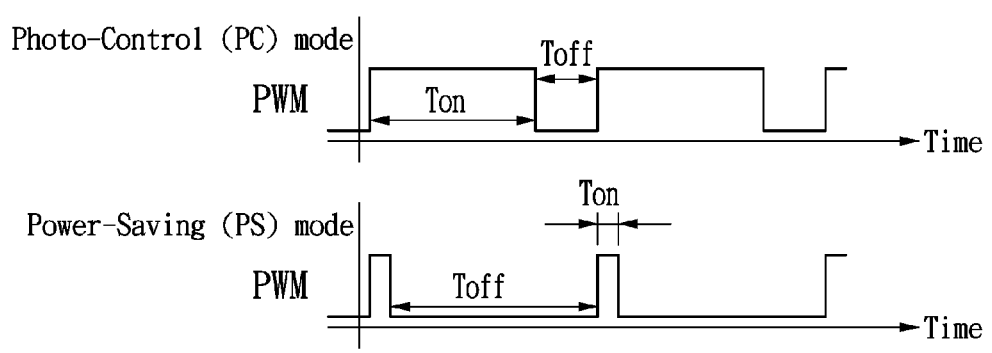
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate high illumination, which may be classified as the high level illumination; whereas as the conduction period $T_{on}$ of transistor Q1 is shorter in the PS mode, therefore have lower average electric current driving the light-emitting unit 250 thereby generate low illumination, which may be classified as the low level illumination.

The microcontroller 240 turns off the light-emitting unit 250 during the day and activates the PC mode at night by turning on the light-emitting unit 250 to generate the high level illumination for a short predetermined duration then return to the low level illumination thereby entering the PS mode. When the motion sensor 230 detects a human motion in the PS mode, the light-emitting unit 250 may switch to the high level illumination for illumination or warning application. The light-emitting unit 250 may return to the low level illumination after maintaining at the high level illumination for a short predetermined duration to save energy.

In addition, the microcontroller 240 is coupled to a time setting unit 260, wherein the time setting unit 260 may allow the user to configure the predetermined duration associated with the high level illumination in the PC mode, however the present disclosure is not limited thereto.

Second Exemplary Embodiment

Refer again to FIG. 1, wherein the illumination variations of the light-emitting unit 150 may be implemented through the number of light-source loads being turned on to generate more than two levels of illumination. The lighting apparatus 100 in the instant exemplary embodiment may be through turning on a portion of LEDs or all the LEDs to generate a low and a high level of illuminations.

Figure 3A:
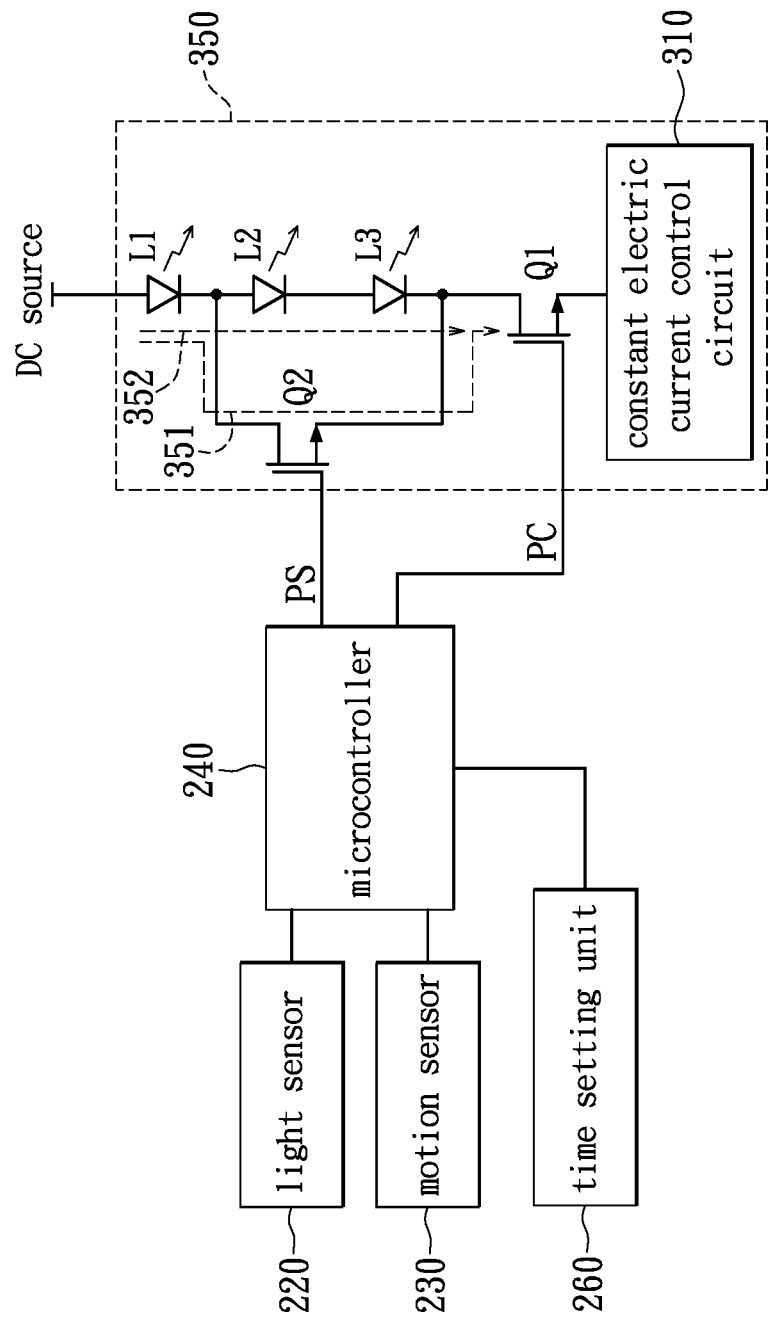
FIG. 3A illustrates a schematic diagram of a two-level LED security light in accordance to the second exemplary embodiment of the present disclosure.

Refer to FIG. 3A concurrently, which illustrates a schematic diagram of a two-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2. The LEDs L1~L3 are series connected to the transistor Q1 at same time connected between the DC source and a constant electric current control circuit 310. Moreover, transistor Q2 is parallel connected to the two ends associated with LEDs L2 and L3. The gates of the transistors Q1 and Q2 are connected respectively to a pin PC and a pin PS of the microcontroller 240. The constant electric current control circuit 310 in the instant exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 detects that the ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a predetermined duration. After the predetermined duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
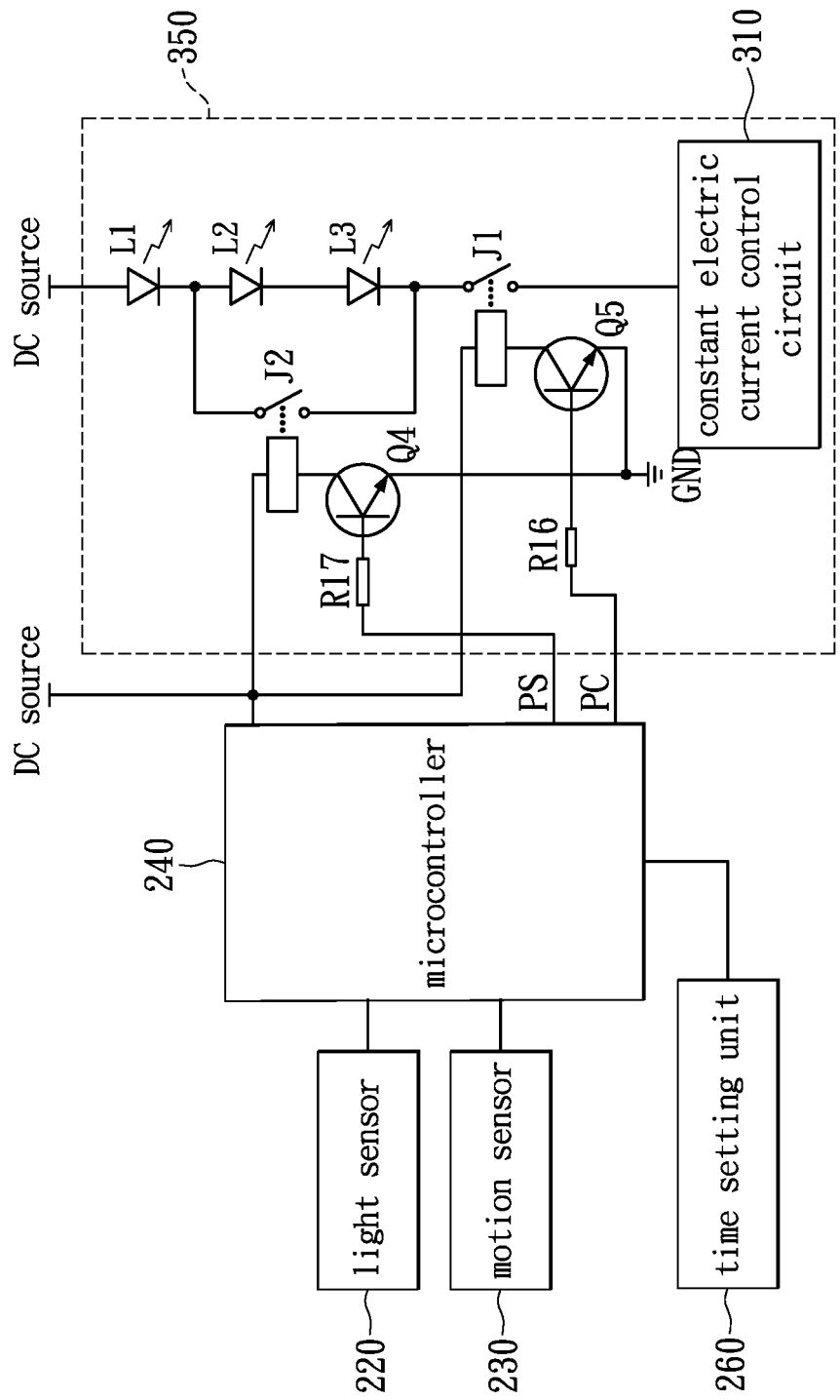
FIG. 3B illustrates a schematic diagram of a two-level LED security light in accordance to the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates the high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having color temperature of 2700 K while the LEDs L2 and L3 may adopt LEDs having color temperature of 5000 K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may include a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

Third Exemplary Embodiment

Refer back to FIG. 1, wherein the light-emitting unit 150 may include a phase controller and one or more parallel-connected alternating current (AC) LEDs. The phase controller is coupled between the described one or more parallel-connected ACLEDs and AC power source. The loading and power controller 140 in the instant exemplary embodiment may through the phase controller adjust the average power of the light-emitting unit 150 so as to generate variations in the low level and the high level illuminations.

Figure 4A:
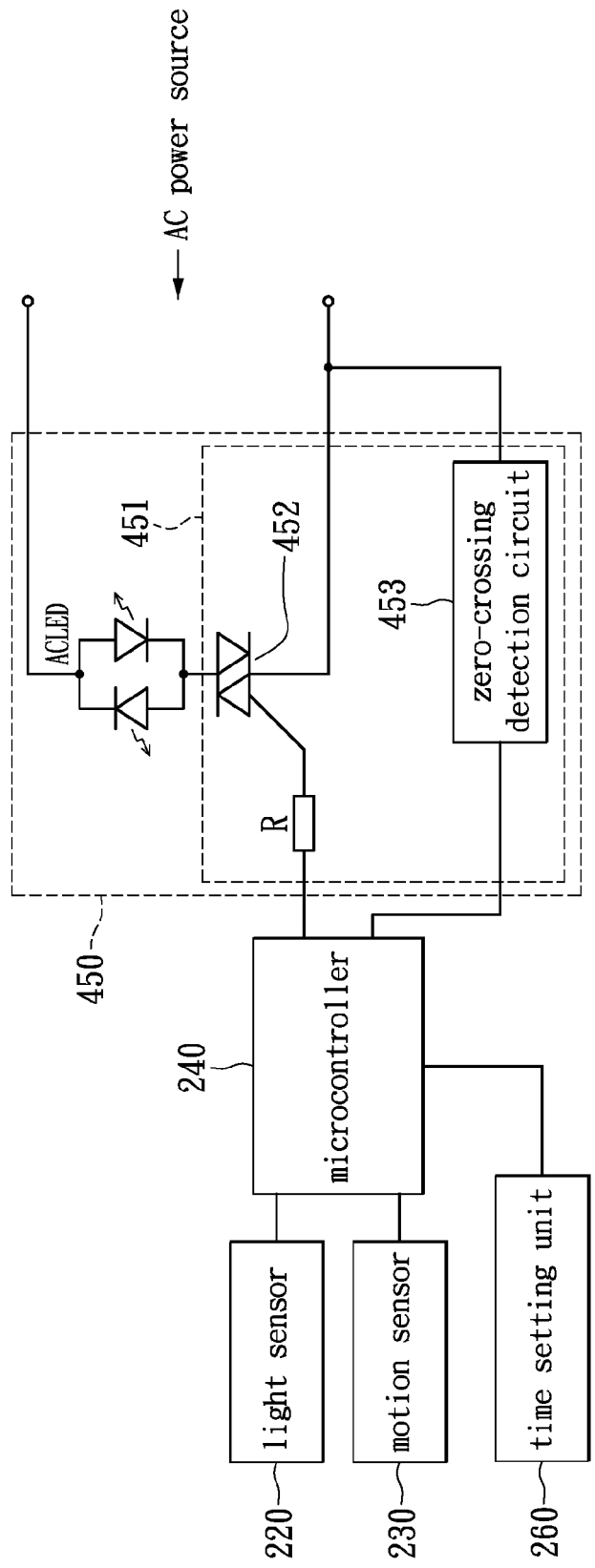
FIG. 4A illustrates a schematic diagram of a two-level LED security light in accordance to the third exemplary embodiment of the present disclosure.

Refer to FIG. 4A, which illustrates a schematic diagram of a two-level LED security light 100 in accordance to the third exemplary embodiment of the present disclosure. The main difference between FIG. 4A and FIG. 3 is in that the light-source load is an ACLED, which is coupled to the AC power source, and further the light-emitting unit 450 includes a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined duration. Then the microcontroller 240 outputs the pulse signal for PS mode through the same control pin to trigger the triac 452 to have a small conduction angle for switching the light-emitting unit 450 from the high level illumination to the low level illumination of the PS mode. Moreover, when the motion sensor 230 (also called motion sensing unit) detects a human motion in the PS mode, the microcontroller 240 temporarily outputs the PC-mode pulse signal through the same control pin to have the light-emitting unit 450 generated the high level illumination for a short predetermined duration. After the short predetermined duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_0 < t_D < \frac{1}{2}f - t_0$ for a light-source load with a cut-in voltage $V_t$, wherein $t_0 = (1/2\pi f)\sin^{-1}(V_t/V_m)$. The described criterion is applicable to all types of ACLEDs to assure that the triac 452 can be stably triggered in both positive and negative half cycle of the AC power source. Take ACLED with $V_t$(rms)=80V as an example, and supposing the $V_m$(rms)=110V and f=60 Hz, then $t_0$=2.2 ms and (½f)=8.3 ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$<6.1 ms.

Figure 4B:
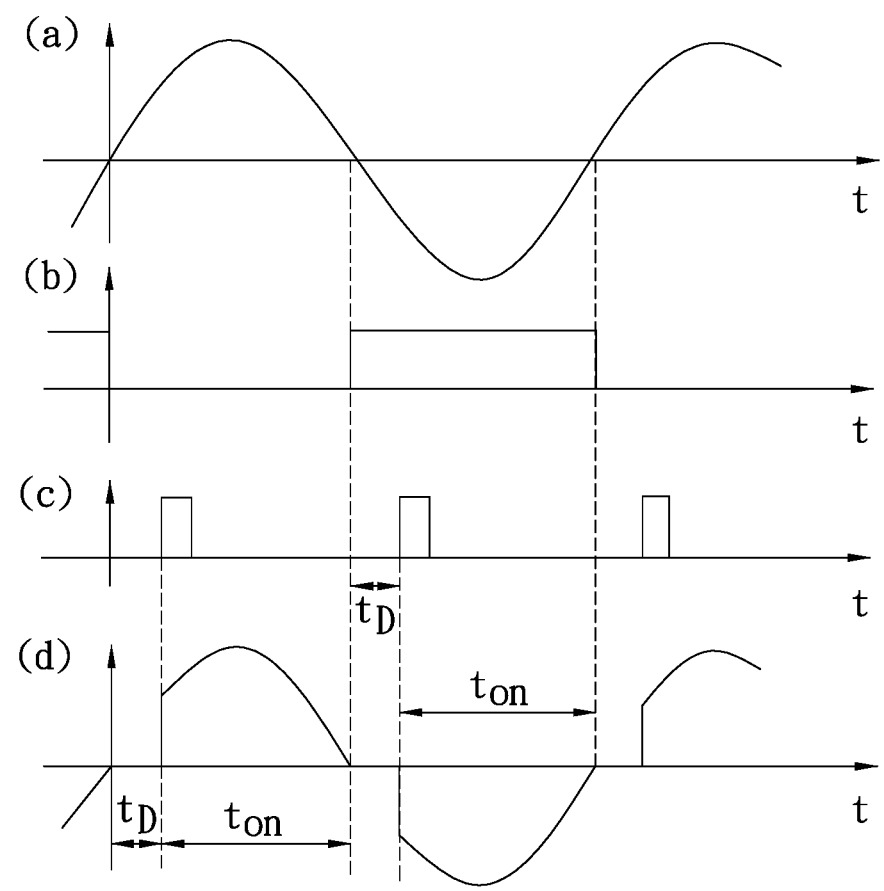
FIG. 4B illustrates a timing waveform of two-level LED security light in accordance to the third exemplary embodiment of the present disclosure.

Refer to FIG. 4B, which illustrates a timing waveform of the two-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
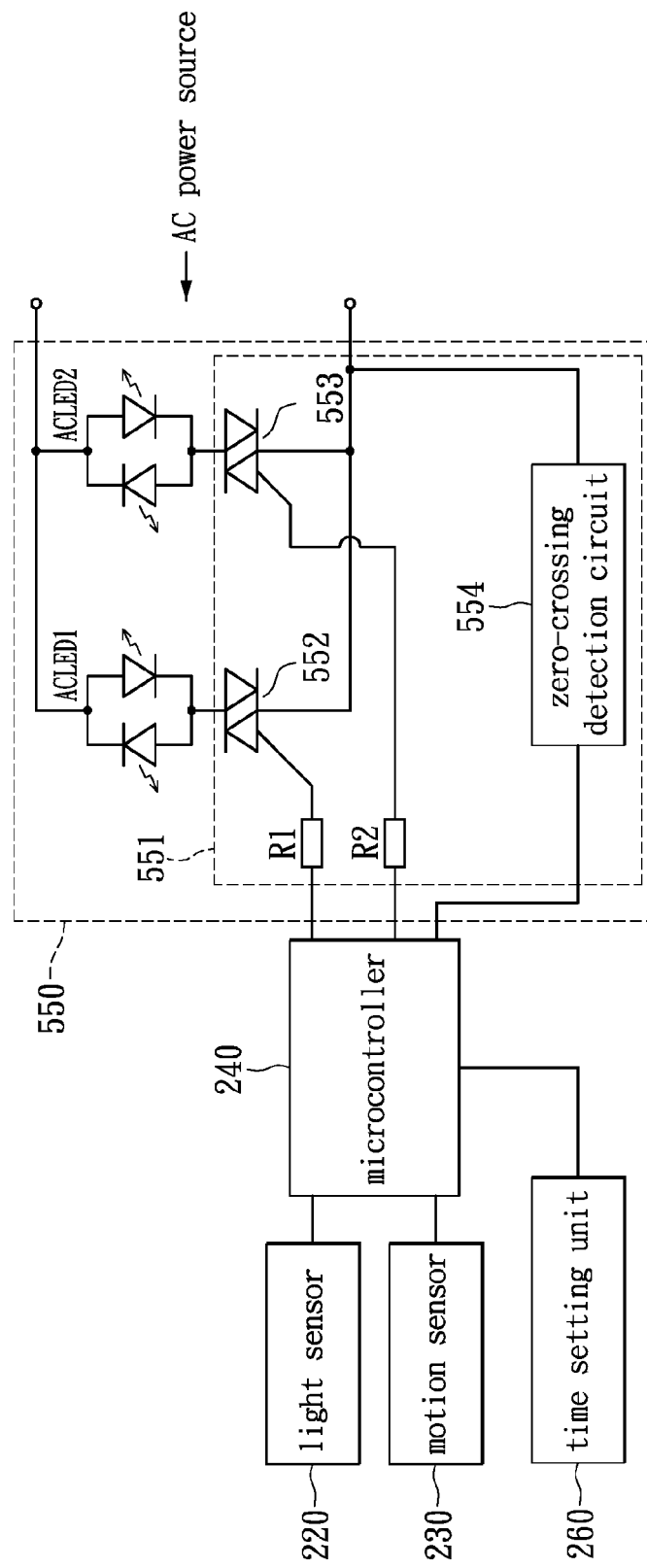
FIG. 5 illustrates a schematic diagram of a two-level LED security light in accordance to the third exemplary embodiment of the present disclosure.

Refer to FIG. 5, which illustrates a schematic diagram of a two-level LED security light 100 in accordance to the third exemplary embodiment of the present disclosure. The light-emitting unit 550 of the lighting apparatus 100 includes an ACLED1, an ACLED2, and a phase controller 551. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLEDs and more than one bi-directional switching devices. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
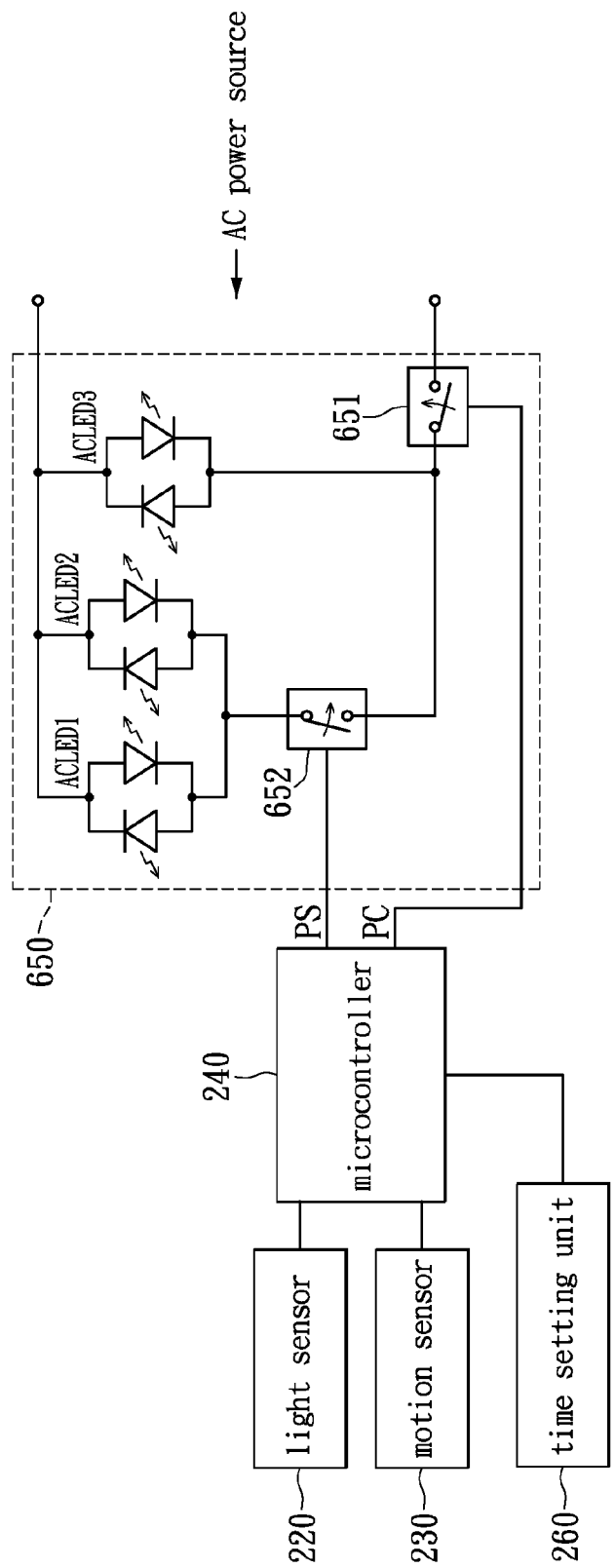
FIG. 6 illustrates a schematic diagram of a two-level LED security light in accordance to the fourth exemplary embodiment of the present disclosure.

Refer to FIG. 6, which illustrates a schematic diagram of a two-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power as well as switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to1.

The ACLED1 and ACLED2 of FIG. 6 may be high power lighting sources having color temperature of 5000 K. The ACLED3 may be a low power lighting source having color temperature of 2700 K. Consequently, the ACLED may generate two levels of illuminations with high illumination and hue contrast without using a zero-crossing detection circuit.

Fifth Exemplary Embodiment

Figure 7:
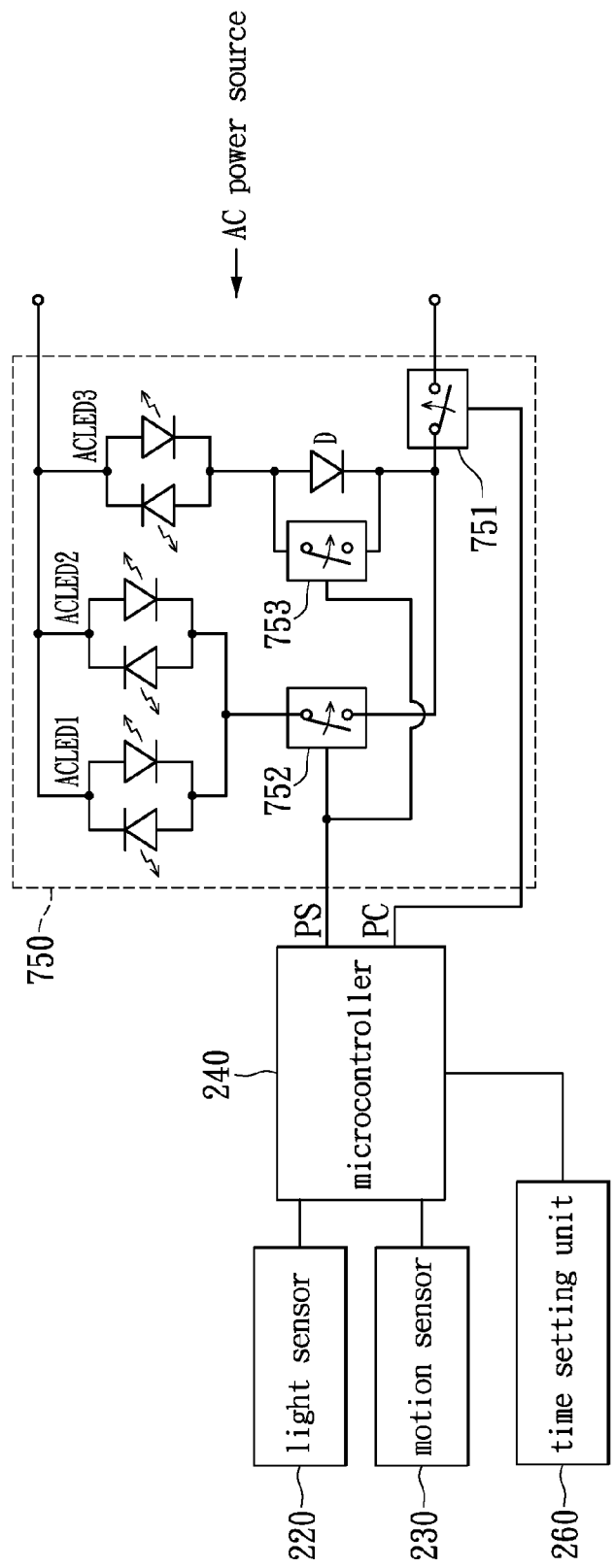
FIG. 7 illustrates a schematic diagram of a two-level LED security light in accordance to the fifth exemplary embodiment of the present disclosure.

Refer to FIG. 7, which illustrates a schematic diagram of a two-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ALCED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

A lighting apparatus may be implemented by integrating a plurality of LEDs with a microcontroller and various types of sensor components in the controlling circuit in accordance to the above described five exemplary embodiments. This lighting apparatus may automatically generate high level illumination when the ambient light detected is insufficient and time-switch to the low level illumination. In addition, when a person is entering the predetermined detection zone, the lighting apparatus may switch from the low level illumination to the high level illumination, to provide the person with sufficient illumination or to generate strong illumination and hue contrast for monitoring the intruder.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A LED security light, comprising:
   a light-emitting unit, comprising a LED lamp;
   a loading and power control unit;
   a light sensing control unit;
   a motion sensing unit; and
   a power supply unit;
   wherein the light-emitting unit is angle adjustable to provide illumination projection toward desired living spaces for performing security protection; wherein the loading and power control unit comprises a microcontroller electrically coupled with a switching circuitry, wherein the switching circuitry is electrically connected with a power source and the LED lamp of the light-emitting unit, wherein the microcontroller outputs a control signal to control a conduction period and a cut-off period of the switching circuitry for delivering different average electric powers from the power source to drive the light-emitting unit for generating different illuminations, wherein the microcontroller controls the switching circuitry respectively to have at least a short conduction period and at least a long conduction period such that the light-emitting unit respectively generates at least a low level illumination and at least a high level illumination according to signal received from the light sensing control unit or the motion sensing unit;
   wherein the power supply unit is an AC/DC power converter to convert AC power into DC power required for operating the LED security light, wherein the power source is a DC power from the power supply unit; wherein the switching circuitry comprises at least a unidirectional semiconductor switching device; wherein the microcontroller outputs a pulse width modulation (PWM) signal to control the conduction period $T_{on}$ and the cut-off period $T_{off}$ of the unidirectional semiconductor switching device for delivering different average electric currents from the power source to drive the light-emitting unit for generating different illuminations; and
   wherein a DC power source in conjunction with the LED lamp is designed with a configuration of in series and in parallel connections such that the electric current passing through each LED of the LED lamp remains at an adequate level such that a voltage V across each LED complies with an operating constraint of $V_t<V<V_m$ featuring electrical characteristics of the LED, wherein $V_t$ is a minimum threshold voltage required to trigger the LED to start emitting light and $V_m$ is a maximum operating voltage across the LED.

2. The LED security light according to claim 1, wherein the microcontroller is an integrated circuit device programmable for generating the control signal.

3. The LED security light according claim 1, wherein the microcontroller is an application specific integrated circuit (ASIC) customized for generating the control signal.

4. A LED security light control device, comprising:
   a loading and power control unit;
   a light sensing control unit;
   a motion sensing unit; and
   a power supply unit;
   wherein the LED security light control device is electrically connectable to a LED lamp; wherein the loading and power control unit comprises a microcontroller electrically coupled with a switching circuitry, wherein the switching circuitry is electrically connectable with a power source and the LED lamp, wherein the microcontroller outputs a control signal to control a conduction period and a cut-off period of the switching circuitry for delivering different average electric powers from the power source to drive the LED lamp for generating different illuminations, wherein the microcontroller controls the switching circuitry respectively to have at least a short conduction period and at least a long conduction period such that the connectable LED lamp respectively generates at least two illumination modes with different light intensities according to signal received from the light sensing control unit or the motion sensing unit;
   wherein the power supply unit is an AC/DC power converter to convert AC power into DC power required for operating the LED security light control device, wherein the power source is a DC power from the power supply unit; wherein the switching circuitry comprises at least a unidirectional semiconductor switching device, wherein the microcontroller outputs a pulse width modulation (PWM) signal to control the conduction period $T_{on}$ and the cut-off period $T_{off}$ of the unidirectional semiconductor switching device for delivering different average electric currents from the power source to drive the LED lamp for generating different illuminations; and
   wherein a DC power source in conjunction with the LED lamp is designed with a configuration of in series and in parallel connections such that the electric current passing through each LED of the LED lamp remains at an adequate level such that a voltage V across each LED complies with an operating constraint of $V_t<V<V_m$ featuring electrical characteristics of the LED, wherein $V_t$ is a minimum threshold voltage required to trigger the LED to start emitting light and $V_m$ is a maximum operating voltage across the LED.

5. The LED security light control device according to claim 4, wherein the LED security light control device is detachably connectable to a LED lamp via a screw-in or plug-in configuration, wherein the LED security light control device is configured with a socket base, and the LED lamp is constructed with a screw-in head or a plug-in head for making an electrical connection with each other.

6. The LED security light control device according to claim 5, wherein the LED lamp, when connected with the LED security light control device, is angle adjustable.

7. The LED security light control device according to claim 5, wherein the LED lamp, when connected with the LED security light control device, is non-angle adjustable.

8. The LED security light control device according to claim 4, wherein the LED security light control device is non-detachably connectable to the LED lamp.

9. The LED security light control device according to claim 8, wherein the LED lamp, when connected with the LED security light control device, is angle adjustable.

10. The LED security light control device according to claim 8, wherein the LED lamp, when connected with the LED security light control device, is non-angle adjustable.

11. The LED security light control device according to claim 4, wherein the microcontroller is an integrated circuit device programmable for generating the control signal.

12. The LED security light control device according claim 4, wherein the microcontroller is an application specific integrated circuit (ASIC) customized for generating the control signal.

13. The LED security light control device according to claim 4, wherein a time setting unit is further installed for adjusting or setting time duration(s) of at least one of the different illumination modes.

14. A LED security light, comprising:
a light-emitting unit, comprising a LED lamp;
a loading and power control unit;
a light sensing control unit;
a motion sensing unit; and
a power supply unit;
wherein the light-emitting unit is non-angle adjustable to provide illumination projection along a fixed direction; wherein the loading and power control unit comprises a microcontroller electrically coupled with a switching circuitry, wherein the switching circuitry is electrically connected with a power source and with the LED lamp of the light-emitting unit, wherein the microcontroller outputs a control signal to control a conduction period and a cut-off period of the switching circuitry for delivering different average electric currents from the power source to drive the light-emitting unit for generating different illuminations, wherein the microcontroller controls the switching circuitry respectively to have at least a short conduction period and at least a long conduction period such that the light-emitting unit respectively generates at least a low level illumination and at least a high level illumination according to signal received from the light sensing control unit or the motion sensing unit;
wherein the power supply unit is an AC/DC power converter to convert AC power into DC power required for operating the LED security light, wherein the power source is a DC power from the power supply unit; wherein the switching circuitry comprises at least a unidirectional semiconductor switching device, wherein the microcontroller outputs a pulse width modulation (PWM) signal to control the conduction period $T_{on}$ and the cut-off period $T_{off}$ of the switching circuitry for delivering different average electric currents from the power source to drive the light-emitting unit for generating different illuminations; and
wherein a DC power source in conjunction with the LED lamp is designed with a configuration of in series and in parallel connections such that the electric current passing through each LED of the LED lamp remains at an adequate level such that a voltage V across each LED complies with an operating constraint of $V_t < V < V_m$ featuring electrical characteristics of the LED, wherein $V_t$ is a minimum threshold voltage required to trigger the LED to start emitting light and $V_m$ is a maximum operating voltage across the LED.

15. The LED security light according to claim 14, wherein the microcontroller is an integrated circuit device programmable for generating the control signal.

16. The LED security light according claim 14, wherein the microcontroller is an application specific integrated circuit (ASIC) customized for generating the control signal.

17. A LED security light, comprising:
a light-emitting unit, comprising a LED lamp;
a loading and power control unit;
a light sensing control unit;
a motion sensing unit; and
a power supply unit;
wherein the loading and power control unit comprises a microcontroller electrically coupled with a switching circuitry, wherein the switching circuitry is electrically connected with a power source and the LED lamp of the light-emitting unit, wherein the microcontroller outputs a control signal to control a conduction period and a cut-off period of the switching circuitry for delivering different average electric powers from the power source to drive the light-emitting unit for generating different illuminations, wherein the microcontroller controls the switching circuitry respectively to have at least a short conduction period and at least a long conduction period such that the light-emitting unit respectively generates at least a low level illumination and at least a high level illumination according to signal received from the light sensing control unit or the motion sensing unit;
wherein the power supply unit is a battery module to output DC power for operating the LED security light, wherein the power source is a DC power from the battery module, wherein the switching circuitry comprises at least a unidirectional semiconductor switching device, wherein the microcontroller outputs a pulse width modulation (PWM) signal to respectively control the conduction period $T_{on}$ and the cut-off period $T_{off}$ of the unidirectional semiconductor switching device for delivering different average electric currents from the power source to drive the light-emitting unit for generating different illuminations; and
wherein a DC power source in conjunction with the LED lamp is designed with a configuration of in series and in parallel connections such that the electric current passing through each LED of the LED lamp remains at an adequate level such that a voltage V across each LED complies with an operating constraint of $V_t < V < V_m$ featuring electrical characteristics of the LED, wherein $V_t$ is a minimum threshold voltage required to trigger the LED to start emitting light and $V_m$ is a maximum operating voltage across the LED.

18. The LED security light according to claim 17, wherein the microcontroller is an integrated circuit device programmable for generating the control signal.

19. The LED security light according claim 17, wherein the microcontroller is an application specific integrated circuit (ASIC) customized for generating the control signal.

20. The LED security light according to claim 17, wherein the battery module is a solar battery module comprising a solar panel circuitry for charging a rechargeable battery.

21. A LED security light, comprising:
a light-emitting unit, comprising a LED lamp;
a loading and power control unit;
a light sensing control unit;
a motion sensing unit; and
a power supply unit;
wherein the loading and power control unit comprises a microcontroller electrically coupled with a switching circuitry, wherein the switching circuitry is electrically connected with a power source and the LED lamp of the light-emitting unit, wherein the microcontroller outputs a control signal to control a conduction period and a cut-off period of the switching circuitry for delivering different average electric powers from the power source to drive the light-emitting unit for generating different illuminations, wherein the microcontroller controls the switching circuitry respectively to have at least a short conduction period and at least a long conduction period such that the light-emitting unit respectively generates at least a low level illumination and at least a high level illumination according to signal received from the light sensing control unit or the motion sensing unit;
wherein the power supply unit is an AC/DC power converter to convert AC power into DC power for operating the LED security light, wherein the power source is an AC power source, wherein the light-emitting unit is a LED lamp adaptable to the AC power source, wherein the switching circuitry comprises a phase controller containing a bidirectional semiconductor switching device, wherein a zero-crossing detection circuit is electrically coupled to the microcontroller, wherein the bidirectional semiconductor switching device is connected in series between the AC power source and the LED lamp, and wherein the microcontroller incorporating with the zero-crossing detection circuit outputs a time delay pulse lagging behind the zero-crossing point in each half cycle of the AC power source to control the conduction rate of the phase controller for delivering different average AC powers to drive the LED lamp for generating different illumination modes according to signal received from the light sensing control unit or the motion sensing unit.

22. The LED security light according to claim 21, wherein the microcontroller is an integrated circuit device programmable for generating the control signal.

23. The LED security light according claim 21, wherein the microcontroller is an application specific integrated circuit (ASIC) customized for generating the control signal.

24. The LED security light according to claim 21, wherein the LED lamp is a DC LED module bridging at least one port of a full wave rectifier to receive AC power delivered by the AC power source controlled by the loading and power control unit.

25. The LED security light according to claim 21, wherein the LED lamp is a LED module comprising two polarity reverse LED arrays connected in parallel, wherein a first LED array conducts in a positive half cycle of the AC power source controlled by the loading and power control unit while a second LED array conducts in a negative half cycle of the AC power source controlled by the loading and power control unit.

26. The LED security light according to claim 21, wherein in order to ensure a successful conduction the phase controller is confined to operate in a dimmable time phase domain between $t_0$ and $\frac{1}{2}f-t_0$, wherein f is the frequency of the AC power source, and $t_0$ is a corresponding time phase of a cut-in voltage at which the LED lamp starts to emit light.

27. A LED security light control device, comprising:
a loading and power control unit;
a light sensing control unit;
a motion sensing unit; and
a power supply unit;
wherein the LED security light control device is electrically connectable to a LED lamp; wherein the loading and power control unit comprises a microcontroller electrically coupled with a switching circuitry, wherein the switching circuitry is electrically connectable with a power source and the LED lamp, wherein the microcontroller outputs a control signal to control a conduction period and a cut-off period of the switching circuitry for delivering different average electric powers from the power source to drive the LED lamp for generating different illuminations, wherein the microcontroller controls the switching circuitry respectively to have at least a short conduction period and at least a long conduction period such that the connectable LED lamp respectively generates at least two illumination modes with different light intensities according to signal received from the light sensing control unit or the motion sensing unit;
wherein the power supply unit is a battery module to output DC power for operating the LED security light control device, wherein the power source is a DC power from the battery module, wherein the switching circuitry comprises at least a unidirectional semiconductor switching device, wherein the microcontroller outputs a pulse width modulation (PWM) signal to respectively control the conduction period $T_{on}$ and the cut-off period $T_{off}$ of the unidirectional semiconductor switching device for delivering different average electric currents from the power source to drive the LED lamp for generating different illuminations; and
wherein a DC power source in conjunction with the LED lamp is designed with a configuration of in series and in parallel connections such that the electric current passing through each LED of the LED lamp remains at an adequate level such that a voltage V across each LED complies with an operating constraint of $V_t < V < V_m$ featuring electrical characteristics of the LED, wherein $V_t$ is a minimum threshold voltage required to trigger the LED to start emitting light and $V_m$ is a maximum operating voltage across the LED.

28. The LED security light control device according to claim 27, wherein the LED security light control device is detachably connectable to a LED lamp via a screw-in or plug-in configuration, wherein the LED security light control device is configured with a socket base, and the LED lamp is constructed with a screw-in head or a plug-in head for making an electrical connection with each other.

29. The LED security light control device according to claim 28, wherein the LED lamp, when connected with the LED security light control device, is angle adjustable.

30. The LED security light control device according to claim 28, wherein the LED lamp, when connected with the LED security light control device, is non-angle adjustable.

31. The LED security light control device according to claim 27, wherein the LED security light control device is non-detachably connectable to the LED lamp.

32. The LED security light control device according to claim 31, wherein the LED lamp, when connected with the LED security light control device, is angle adjustable.

33. The LED security light control device according to claim 31, wherein the LED lamp, when connected with the LED security light control device, is non-angle adjustable.

34. The LED security light control device according to claim 27, wherein the microcontroller is an integrated circuit device programmable for generating the control signal.

35. The LED security light control device according claim 27, wherein the microcontroller is an application specific integrated circuit (ASIC) customized for generating the control signal.

36. The LED security light control device according to claim 27, wherein the battery module is a solar battery module comprising a solar panel circuitry for charging a rechargeable battery.

37. A LED security light control device, comprising:
a loading and power control unit;
a light sensing control unit;
a motion sensing unit; and
a power supply unit;
wherein the LED security light control device is electrically connectable to a LED lamp; wherein the loading and power control unit comprises a microcontroller electrically coupled with a switching circuitry, wherein the switching circuitry is electrically connectable with a power source and the LED lamp, wherein the microcontroller outputs a control signal to control a conduction period and a cut-off period of the switching circuitry for delivering different average electric powers from the power source to drive the LED lamp for generating different illuminations, wherein the microcontroller controls the switching circuitry respectively to have at least a short conduction period and at least a long conduction period such that the connectable LED lamp respectively generates at least two illumination modes with different light intensities according to signal received from the light sensing control unit or the motion sensing unit;
wherein the power supply unit is an AC/DC power converter to convert AC power source into DC power for operating the LED security light, wherein the power source is an AC power source, wherein the LED lamp is adaptable to the AC power source, wherein the switching circuitry comprises a phase controller containing a bidirectional semiconductor switching device, wherein a zero-crossing detection circuit is electrically coupled to the microcontroller, wherein the bidirectional semiconductor switching device is connected in series between the AC power source and the LED lamp, and wherein the microcontroller incorporating with the zero-crossing detection circuit outputs a time delay pulse lagging behind the zero-crossing point in each half cycle of the AC power source to control the conduction rate of the phase controller for delivering different average AC power to drive the LED lamp for generating different illumination modes according to the signal received from the light sensing control unit and the motion sensing unit.

38. The LED security light control device according to claim 37, wherein the LED security light control device is detachably connectable to a LED lamp via a screw-in or plug-in configuration, wherein the LED security light control device is configured with a socket base, and the LED lamp is constructed with a screw-in head or a plug-in head for making an electrical connection with each other.

39. The LED security light control device according to claim 38, wherein the LED lamp, when connected with the LED security light control device, is angle adjustable.

40. The LED security light control device according to claim 38, wherein the LED lamp, when connected with the LED security light control device, is non-angle adjustable.

41. The LED security light control device according to claim 37, wherein the LED security light control device is non-detachably connectable to the LED lamp.

42. The LED security light control device according to claim 41, wherein the LED lamp, when connected with the LED security light control device, is angle adjustable.

43. The LED security light control device according to claim 41, wherein the LED lamp, when connected with the LED security light control device, is non-angle adjustable.

44. The LED security light control device according to claim 37, wherein the microcontroller is an integrated circuit device programmable for generating the control signal.

45. The LED security light control device according claim 37, wherein the microcontroller is an application specific integrated circuit (ASIC) customized for generating the control signal.

46. The LED security light control device according to claim 37, wherein the LED lamp is a DC LED module bridging at least one port of a full wave rectifier to receive AC power delivered by the AC power source controlled by the loading and power control unit.

47. The LED security light control device according to claim 37, wherein the LED lamp is a LED module comprising two polarity reverse LED arrays connected in parallel, wherein a first LED array conducts in a positive half cycle of the AC power source controlled by the loading and power control unit while a second LED array conducts in a negative half cycle of the AC power source controlled by the loading and power control unit.

48. The LED security light control device according to claim 37, wherein in order to ensure a successful conduction the phase controller is confined to operate in a dimmable time phase domain between $t_0$ and $\frac{1}{2}f - t_0$, wherein f is the frequency of the AC power source, and $t_0$ is a corresponding time phase of a cut-in voltage at which the connectable LED lamp starts to emit light.

* * * * *